United States Patent Office 2,728,731
Patented Dec. 27, 1955

2,728,731

METHOD OF MAKING ELECTROLUMINESCENT PHOSPHORS

Keith H. Butler, Marblehead, Mass., and Alden B. Davis, Towanda, Pa., assignors to Sylvania Electric Products Inc., Salem, Mass., a corporation of Massachusetts No Drawing. Application September 9, 1952,
Serial No. 308,716

5 Claims. (Cl. 252—301.6)

This application relates to methods of making electroluminescent phosphors, that is to phosphors which luminesce under the action of an electric field.

Such phosphors have previously been made by firing a mixture of suitable ingredients while a gas flowed over its surface. This often resulted in the presence of discrete particles of lead sulfide dispersed through the phosphor. In the copending application Serial No. 230,713, filed June 8, 1951, by Keith H. Butler and Horace H. Homer, the use of a controlled gas flow was described, which allowed the lead content of the phosphor to be more precisely controlled and largely prevented the formation of lead sulfide in the body of the phosphor mass by evaporation of excess lead.

We have discovered that excellent electroluminescent phosphors can be prepared by restricting the ventilation during the firing of a mixture of suitable ingredients, for example by firing the mixture in a covered crucible, a mixture such as zinc sulfide with copper and lead in activating amounts being used. If the zinc sulfide contains considerable amounts of chloride, green electroluminescent phosphors result while if little or no chloride is present, the electroluminescence is blue, as pointed out, for example, in copending application Serial No. 306,727, filed by Keith H. Butler and Horace H. Homer on or about August 27, 1952. By adding a third activator, manganese, the color can be made to vary from green to a deep orange by varying the concentration of manganese.

The electroluminescent phosphor can also be made by firing the zinc sulfide containing copper, with or without chloride and with or without manganese, in a covered crucible and then crushing the mass and returning it to the crucible together with small amount of lead compound, and then refiring to obtain the electroluminescent phosphors.

Among the advantages of this new method of firing in covered crucibles, are namely, the generally high brightness of the phosphors and the segregation of a black layer, believed to be lead sulfide, on the surface of the fired powder in the crucible. This segregation allows the lead sulfide to be readily removed from the phosphor by mechanically separating the black layer from the body of the phosphor mass. This is an important advantage, since these lead sulfide crystals have extremely high conductivity and cause arcing, if they are present in the phosphor, when it is made into an electroluminescent lamp.

As one example of our new method of preparing electroluminescent phosphors, we will describe the preparation of a green phosphor.

The following materials were thoroughly mixed by dry blending, hammermilling, and then rolling in a bottle for two hours.

| | G. |
|---|---|
| Zinc sulfide (containing 2.5% chloride by weight) | 950 |
| Zinc oxide | 41 |
| Lead carbonate | 5.4 |
| Copper oxide | 0.8 |

The thoroughly mixed blend was fired in porcelain crucibles, having a capacity of 40 ml. and provided with covers. After firing, the black surface layer was removed and the remainder of the phosphor ground in a mortar and treated with acetic acid, as described in a copending application, Serial No. 230,713, filed June 8, 1951, by Keith H. Butler and Horace H. Homer. The treated phosphors were tested by mixing 1.2 grams with 1.0 ml. of low acid number castor oil and spreading the mixture in a layer, 0.005 inch thick, between a metal plate and a piece of conducting glass. The light output was measured, in arbitrary units, using a photo-multiplier light sensitive tube with suitable amplifier. A 60 cycle alternating voltage of 500 volts was applied between the metal plate and the conducting glass to generate the light.

The color was determined by using blue and yellow filters in front of the photomultiplier tube and the ratio of the readings, in arbitrary units is given as color ratio in the table below.

*Table I*

| Firing Temp., ° F. | Light Output | Color Ratio | Percent Lead in Fired Powder |
|---|---|---|---|
| 1,350 | 1,700 | 0.77 | .0065 |
| 1,400 | 2,500 | 0.86 | |
| 1,450 | 3,200 | 1.24 | .0045 |
| 1,500 | 2,500 | 1.78 | .0033 |
| 1,540 | 2,360 | 1.56 | .0024 |
| 1,660 | 2,280 | 1.40 | .0012 |
| 1,750 | 2,280 | 1.14 | .0003 |
| 1,850 | 1,570 | 1.03 | .0021 |
| 1,940 | 250 | 1.62 | .0025 |

The same blend was also fired in porcelain crucibles with a capacity of 100 ml. with results as in Table II below:

*Table II*

| Firing Temp., ° F. | Light Output | Color Ratio | Percent Lead in Fired Powder |
|---|---|---|---|
| 1,500 | 2,260 | 1.31 | .0049 |
| 1,660 | 2,200 | 1.38 | .0042 |
| 1,760 | 1,600 | 0.81 | .0013 |

Firing by the batch process in nitrogen gave at 1700° F. a light output of 645 with a color ratio of 1.45.

As a further example, a blue phosphor was made by the same process using a blend containing:

| | G. |
|---|---|
| Zinc sulfide (with .025% Cl) | 475 |
| Zinc oxide | 20 |
| Lead carbonate | 0.68 |
| Copper oxide | 0.24 |

Firing in 40 ml. porcelain crucibles gave results listed in Table III below:

*Table III*

| Firing Temp., ° F. | Light Output | Color Ratio | Percent Lead in Fired Powder |
|---|---|---|---|
| 1,500 | 3,400 | 5.35 | .0090 |
| 1,580 | 3,800 | 5.85 | .0035 |
| 1,660 | 4,600 | 4.75 | .0018 |
| 1,740 | 3,150 | 2.55 | .0009 |
| 1,820 | 1,600 | 3.70 | .0006 |

As a still further example, a blend was made of the following ingredients:

| | G. |
|---|---|
| Zinc sulfide (with 2.5% Cl) | 950 |
| Zinc oxide | 40 |
| Lead carbonate | 5.34 |
| Copper oxide | 0.80 |
| Manganese carbonate | 17.30 |

Firing in 40 ml. porcelain crucible give results as listed below in Table IV:

*Table IV*

| Firing Temp., °F. | Light Output |
|---|---|
| 1,550 | 550 |
| 1,600 | 660 |
| 1,650 | 700 |
| 1,700 | 500 |
| 1,750 | 415 |
| 1,800 | 210 |

While we have mentioned copper oxide, lead carbonate, and lead oxides as the main sources of activating materials, various other compounds may be employed and methods other than dry blending employed for mixing the activators with the zinc sulfide.

As an example of an embodiment in which a lead free powder is first made and then converted to an electroluminescent phosphor by refiring in the presence of lead containing vapors, a blend was made of the following ingredients:

| | G. |
|---|---|
| Zinc sulfide (with 2.5% chloride) | 500 |
| Copper oxide | 0.24 |

This mixture was fired in covered 150 ml. porcelain crucibles, crushed and loaded into 40 ml. crucibles. Approximately 0.05 gram of a lead compound was placed on top of the powder; a cover was placed on the crucible and the whole fired at 1580° F. The fired powder had a black layer over the whole top surface, and the body of the powder was considerably darker than the original charge. This indicates the lead compound has vaporized and spread throughout the crucible, although tending to concentrate on the surface. After removal of this black layer and treatment with acetic acid the phosphor was tested for electroluminescence, with results as listed below in Table V for various lead compounds.

*Table V*

| Lead Cpd. | Light Output | Color Ratio |
|---|---|---|
| PbS | 3,100 | 2.43 |
| PbO | 3,300 | 2.70 |
| $Pb_3O_4$ | 3,500 | 3.05 |
| $PbO_2$ | 3,300 | 2.81 |

This variation of the crucible firing method gives a product which is better in some respects than the product made by mixing the lead compound with the unfired zinc sulfide. Lead compounds have been found to exert a distinct fluxing action causing growth of the particles to a large size, and, also, a sintering of the whole mass. If the phosphor is fired without lead present, a soft pulverulent material results which can then be crushed and refired at a lower temperature in the presence of a volatile lead compound to give a material with good electroluminescence and retaining substantially the same particle size produced in the first firing. The activation by the volatile lead compound can be carried out by firing at any temperature between 1200° F. and 1800° F. though we prefer to use temperatures between 1400 and 1600° F. in most cases.

The use of a covered crucible prevents excessive oxidation of the zinc sulfide and controls the evaporation of lead so that the whole mass of phosphor is exposed during firing to a lead-bearing atmosphere. The unexpected finding that the lead sulfide is present only in a segregated layer gives this method of firing great practical importance, since all other methods lead to the formation of discrete black crystals throughout the phosphor mass, when any substantial excess of lead is present in the mixture. These black crystals, believed to be galena, have high conductivity and thus may cause arcing when the phosphor is made into a lamp.

While we prefer to treat the phosphor with dilute acid to remove the zinc oxide, it is possible to use many of the powders in electroluminescent lamps without acid treatment though the current is generally much higher than that obtained with the treated powder, and the brightness somewhat lower.

The zinc in the zinc sulphide can be replaced partly or entirely by other metals such as cadmium, and the sulfide can be replaced partly or entirely by other substances such as selenide. Other compounds of lead can be used for activation, for example the oxide, chloride, or acetate. Similarly other copper compounds, for example the carbonate, chloride or acetate, can be used, and the same is true of the manganese.

The covering of the crucible restricts the ventilation of the mixture being fired, thus restricting the flow of gas or gases into and out of the crucible. An atmosphere of gases evolved from the mixture being fired exists inside the crucible, and the entry of air from outside the crucible is reduced or eliminated. The cover can fit the crucible loosely, as would be characteristic of a porcelain crucible with a porcelain cover lying in place on it, for example.

What we claim is:

1. The method of making an electroluminescent phosphor containing a small amount of lead, which method comprises mixing zinc sulfide with activating compounds of copper and lead, firing the resultant mixture in the temperature range between 1200° and 1800° F., restricting the ventilation during firing sufficiently to form a black surface layer from the fired mixture removing said black surface layer, and then removing the remainder of the fired mixture from the crucible.

2. The method of making a lead-containing copper-activated zinc sulfide electroluminescent phosphor, which method comprises placing a quantity of suitable lead-activating compound over a quantity of copper-activated zinc sulfide, firing the resultant combination of substances in the temperature range between 1200° F. and 1800° F., restricting the ventilation during firing sufficiently to form a black surface layer of lead-containing material thereover, and removing said black surface layer to leave a fired electroluminescent phosphor.

3. The method of making an electroluminescent phosphor containing a small amount of lead, which method comprises mixing with activating compounds of copper and lead a substance selected from the group consisting of zinc sulfide, cadmium sulfide, zinc selenide, cadmium selenide, firing the resultant mixture in the temperature range between 1200° F. and 1800° F., restricting the ventilation during firing sufficiently to form a black surface layer from the fired mixture, removing said black surface layer, and then removing the remainder of the fired mixture from the crucible.

4. The method of making a lead-containing copper-activated electroluminescent phosphor, which method comprises placing a quantity of suitable lead-activating compound over a quantity of a copper-activated material selected from the group consisting of zinc sulfide, cadmium sulfide, zinc selenide, cadmium selenide, firing the resultant combination of substances in the temperature range between 1200° F. and 1800° F., restricting the ventilation during firing sufficiently to form a black surface layer of lead-containing material thereover, and removing said black surface layer to leave a fired electroluminescent phosphor.

5. The method of making an electroluminescent phosphor containing a small amount of lead, which method comprises mixing with activating compounds of copper, manganese and lead a substance selected from the group consisting of zinc sulfide, cadmium sulfide, zinc selenide, cadmium selenide, firing the resultant mixture in the temperature range between 1200° F. and 1800° F., restricting the ventilation during firing sufficiently to form a black surface layer from the fired mixture, removing said black surface layer, and then removing the remainder of the fired mixture from the crucible.

References Cited in the file of this patent

UNITED STATES PATENTS

| | | |
|---|---|---|
| 2,447,322 | Fonda | Aug. 17, 1948 |
| 2,541,384 | Rothschild | Feb. 13, 1951 |
| 2,624,857 | Mager | Jan. 6, 1953 |